United States Patent [19]

Travers et al.

[11] Patent Number: 5,373,857
[45] Date of Patent: Dec. 20, 1994

[54] HEAD TRACKING APPARATUS

[75] Inventors: Paul J. Travers, Rochester; Ying S. Yee, Pittsford, both of N.Y.

[73] Assignee: Forte Technologies, Inc., Rochester, N.Y.

[21] Appl. No.: 79,466

[22] Filed: Jun. 18, 1993

[51] Int. Cl.$^5$ .............................................. A61B 5/103
[52] U.S. Cl. .................................................... 128/782
[58] Field of Search ................ 128/774, 782; 33/333, 33/355

[56] References Cited

U.S. PATENT DOCUMENTS

| | | | |
|---|---|---|---|
| 3,816,936 | 6/1974 | Parson, Jr. | 33/555 |
| 3,840,726 | 10/1974 | Harrison | 33/555 |
| 4,425,717 | 1/1984 | Marcus | 33/333 |
| 4,884,219 | 11/1989 | Waldren | 364/514 |
| 4,887,081 | 12/1989 | Iihoshi et al. | 340/995 |
| 4,928,709 | 5/1990 | Allison et al. | 128/782 |
| 4,953,304 | 9/1990 | Raitmaa et al. | 33/355 |
| 4,984,179 | 1/1991 | Waldern | 364/514 |
| 4,995,165 | 2/1991 | Daniels | 33/361 |
| 5,138,555 | 8/1992 | Albrecht | 364/424.6 |

*Primary Examiner*—Max Hindenburg
*Attorney, Agent, or Firm*—Cumpston & Shaw

[57] ABSTRACT

A low cost head tracker for a virtual reality head set for determining the orientation of the head set relative to the earth's magnetic field includes a magnetic sensor responsive to the earth's magnetic field, and disposed on the head set and arranged with respect to a vertical axis of rotation of the head set to produce a displacement signal relative to the angular displacement of the head set with respect to a calibration orientation relative to the earth's magnetic field, and a signal processor connected to the magnetic sensor, and responsive to the electrical displacement signal for producing an output signal proportional to the orientation of the head set relative to the calibration orientation.

22 Claims, 5 Drawing Sheets

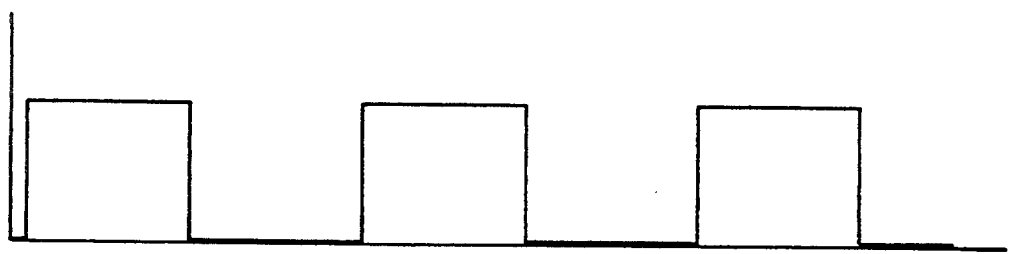
FIG. 4A    TIME ⟶
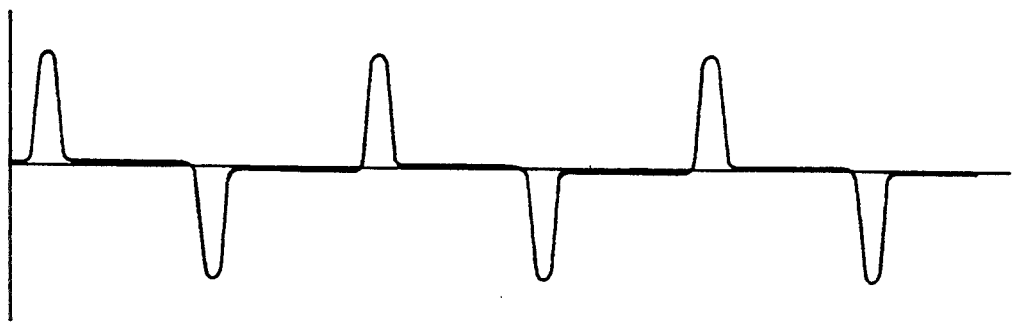
FIG. 4B    TIME ⟶
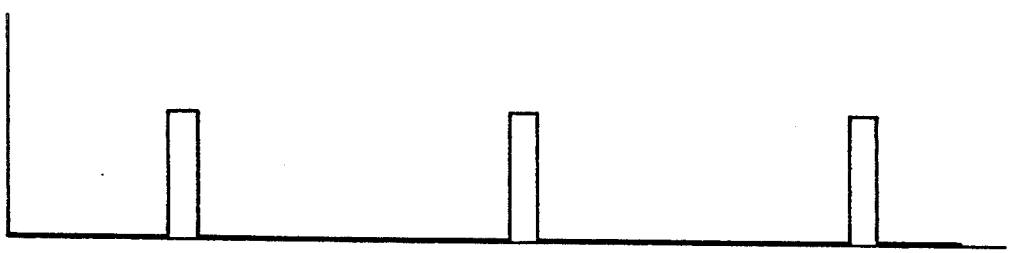
FIG. 4C    TIME ⟶
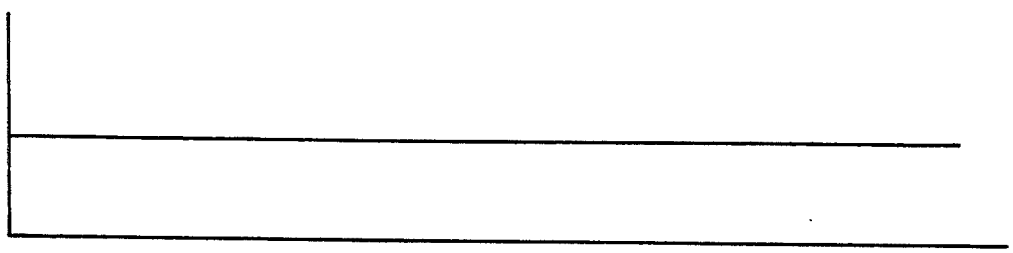
FIG. 4D    TIME ⟶

DEGREES OF ROTATION

HEAD TRACKING APPARATUS

This invention relates generally to apparatus for determining the orientation of the head of the user of a computer display and more particularly to a low cost device for providing signals from which the orientation and tilt of a user's head can be determined, particularly for use in a virtual reality apparatus.

Flux gate magnetometers are generally known. U.S. Pat. No. 3,840,726 describes a system in which a flux gate magnetometer responsive to the earth's magnetic field is worn by a user, such as a foot soldier, to provide direction information to a dead reckoning computer that also includes an accelerometer. The system uses signals from the two sensors to determine distance and direction traveled by the user. The flux gate magnetometer portion of the system comprises a ting core upon which a drive winding and a first pair of output windings connected in series opposition are wound. A second pair of series opposition windings, orthogonal to the first pair, allows the magnetometer to produce signal outputs corresponding to the orientation of the earth's magnetic field vector H in two dimensions. A second magnetometer with a driving winding and one pair of output windings is oriented to provide a signal corresponding to the third direction. The system is designed solely to provide a signal that can be used to calculate the distance and direction in which the user travels.

Flux gate sensors have also been used in vehicle compasses as shown in U.S. Pat. No. 4,425,717 and in sensors as described in U.S. Pat. No. 4,995,165.

There is a need for apparatus that can be worn on the head of a user in a virtual reality system to determine the orientation of the user's head. U.S. Pat. Nos. 4,884,219 and 4,984,179 show a system in which a transmitter is used to generate a low frequency electric field, and sensors are mounted on a helmet to provide data both as to position and orientation of the helmet. U.S. Pat. No. 4,928,709 shows a device for measuring cervical range of motion that uses a conventional magnetic compass.

U.S. Pat. No. 5,138,555 describes a helmet assembly having an unspecified sensing apparatus said to be coupled, for instance, by magnetic fields, in order that a signal representing positioning of the helmet assembly and the pilot's head be available to aiming apparatus. There is no detail.

There is a need for an inexpensive, self contained head tracking system for use in combination with low cost virtual reality apparatus. Although flux gate magnetometers have been used for navigation and other purposes, they have not heretofore been recognized as a viable option for implementing a head tracking system that is self contained, requires no external transmitter, is low in cost, light weight, and reasonably accurate.

Briefly stated and in accordance with a presently preferred aspect of this invention, a low cost head tracker for a virtual reality head set for determining the orientation of the head set relative to the earth's magnetic field includes a magnetic sensor responsive to the earth's magnetic field, and disposed on the head set and arranged with respect to a vertical axis of rotation of the head set to produce a displacement signal relative to the angular displacement of the head set with respect to a calibration orientation relative to the earth's magnetic field, and a signal processor connected to the magnetic sensor, and responsive to the electrical displacement signal for producing an output signal proportional to the orientation of the head set relative to the calibration orientation.

In accordance with another aspect of this invention, the head tracker includes a second, tilt sensor on the head set arranged on an axis for measuring the angular tilt of the head set, the second sensor producing a signal proportional to the tilt of the head set.

In accordance with another aspect of this invention, the signal processor combines the signals from the first and second sensors to produce an output signal proportional to the orientation of the helmet corrected for any error introduced in the displacement signal by any tilt of the head set.

In accordance with a further aspect of this invention, the magnetic sensor comprises a magnetometer having a magnetic permeable core, a drive winding, and a first sense winding, and the signal processor is connected to the sense winding.

In accordance with yet another aspect of this invention, the magnetometer comprises a second sense winding arranged in quadrature relative to the first sense winding, and the signal processor is connected to both the first and second sense windings.

In accordance with a still further aspect of this invention, a signal processor for the head tracker includes a filter for passing high frequency components of this signals from the sense windings, an amplifier for amplifying the high frequency components, and a converter for converting the high frequency components to an output signal.

In accordance with another aspect of the invention, the signal processor includes an oscillator connected to the drive winding and the converter.

In accordance with yet another aspect of the invention, the converter comprises a detector synchronized with the oscillator.

In accordance with a still further aspect of the invention, the signal processor comprises a filter connected to the converter for filtering the displacement signal.

In accordance with yet a further aspect of the invention, the displacement signal is described by the equation $V = M_2 \cos\theta\cos\phi + M_1\sin\phi$ where $M_1$ is the vertical component of the earth's magnetic field, $M_2$ is the horizontal component of the earth's magnetic field, $\theta$ is the orientation of the first sensor and $\phi$ is the orientation of the second, tilt sensor.

The novel aspects of the invention are set forth with particularity in the appended claims. The invention itself, together with further objects and advantages thereof may be more readily comprehended by referring to the following detailed description of a presently preferred embodiment thereof, taken in conjunction with the following drawings, in which:

FIGS. 4a–4d are graphical representations of signals in the signal processor.

Figure 1:
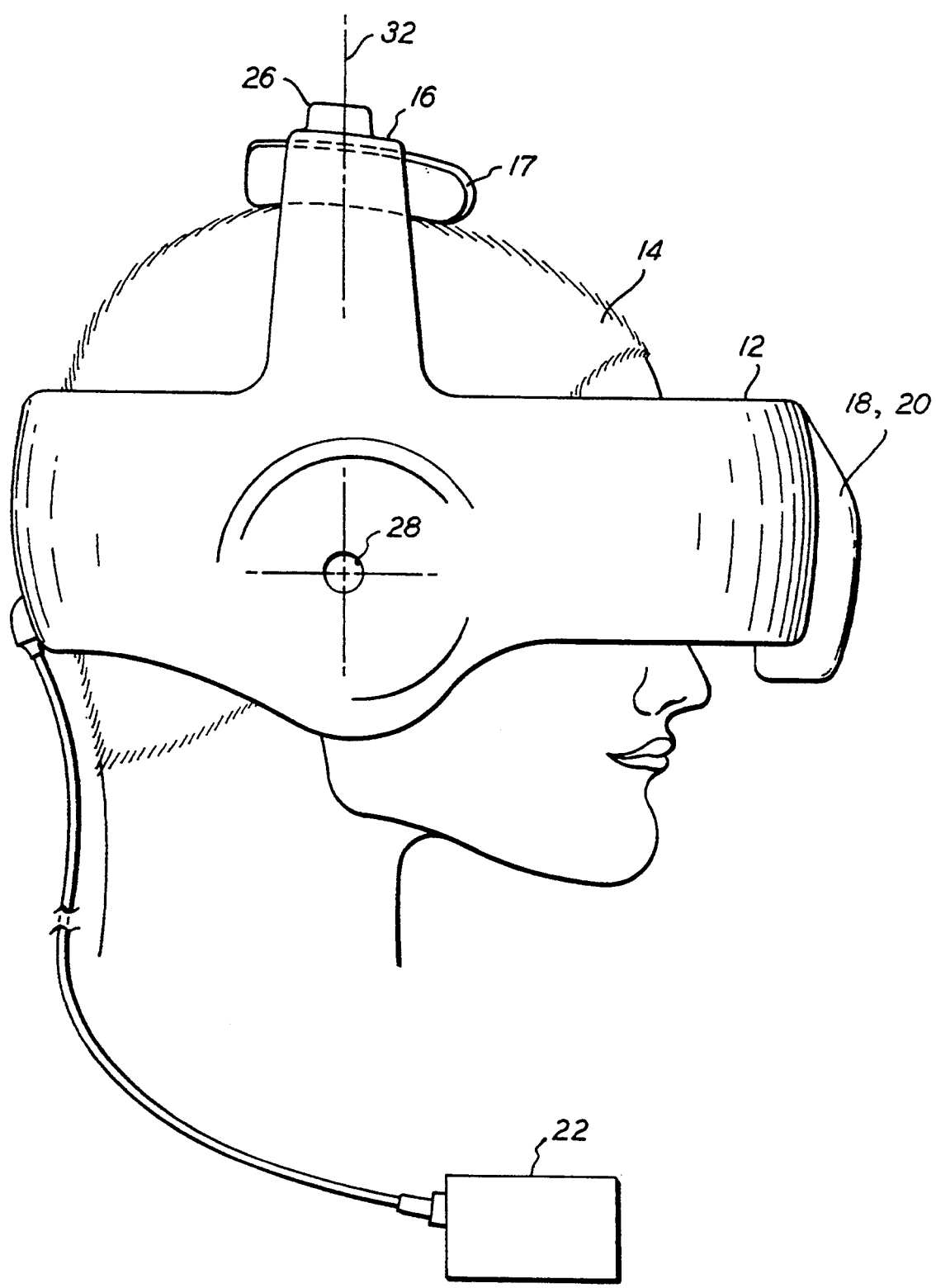
FIG. 1 is a diagrammatic view of a head set fitted with sensors in accordance with this invention.

Referring now to FIG. 1, a head set for use in a virtual reality system or similar system is designated generally at 10. The head set includes a generally horizontally disposed main body 12 encircling the head 14 of the wearer, approximately at eye level. An arch shaped supporting portion 16 preferably provided with a resilient pad 17 extends over the top of the head of the wearer to hold the body 12 in a fixed position. Preferably, the body carries one or two display subsystems 18, 20 positioned in front of the user's left and right eyes respectively so that they can be seen by the user when looking straight ahead, preferably in a binocular fashion so as to permit a three dimensional image to be displayed if desired. Preferably, the display subsystems are arranged close to the user's eyes so as to produce the illusion of a much larger display, such as a display that simulates a realistic situation such as a vertical aircraft simulation, game or the like.

The displays themselves are relatively well known and as such form no part of this invention per se, except in combination with the other elements hereof. It will be understood that a cable, infrared or optical link or the like, between the head set and supporting external systems for generating the display, will need to be provided. A schematic representation of this portion of the invention is designated at 22.

In use, the head set 10 is designed to remain fixed relative to the head of the wearer. That is, the relative position of the displays 18, 20 with respect to the wearer's eyes does not change. This simplifies the optical requirements on the display subsystem, but necessitates providing signals to the display processor that indicate any deviation of the user's head from a nominal calibration position. In low cost virtual reality systems of the type with which the present invention is especially useful, it is sufficient to provide signals representing the angular displacement of the user's head from an arbitrary calibration position. Absolute angular position is not needed. Preferably, the head tracker of this invention includes means for periodically calibrating the headset to a known calibration position. The calibration can be accomplished, for example, by instructing the user to look in a predetermined direction and press a key on a keyboard or a button on a controller, to establish the calibration position. Thereafter, relative displacements from the calibration position are sufficient to control the displays.

The preferred embodiment of this invention includes as azimuth sensor 26 and a tilt sensor 28. Preferably, sensor 26 is a flux gate magnetometer disposed on a central axis of rotation 32. Tilt sensor 28 which may be a magnetic sensor or a less expensive gravity operated sensor or any other sensor that can detect deviations from a horizontal position, is preferably disposed on the side of the helmet, most preferably on an axis extending through the head about which the head tilts. Depending upon the type of tilt sensor it may also be mounted in other positions, for example, on the top of the helmet together with the azimuth sensor.

Together, azimuth sensor 26 and the tilt sensor 28 provide signals to the external system 22 that permit the orientation of the user's head to be determined on three axes.

Figure 2:
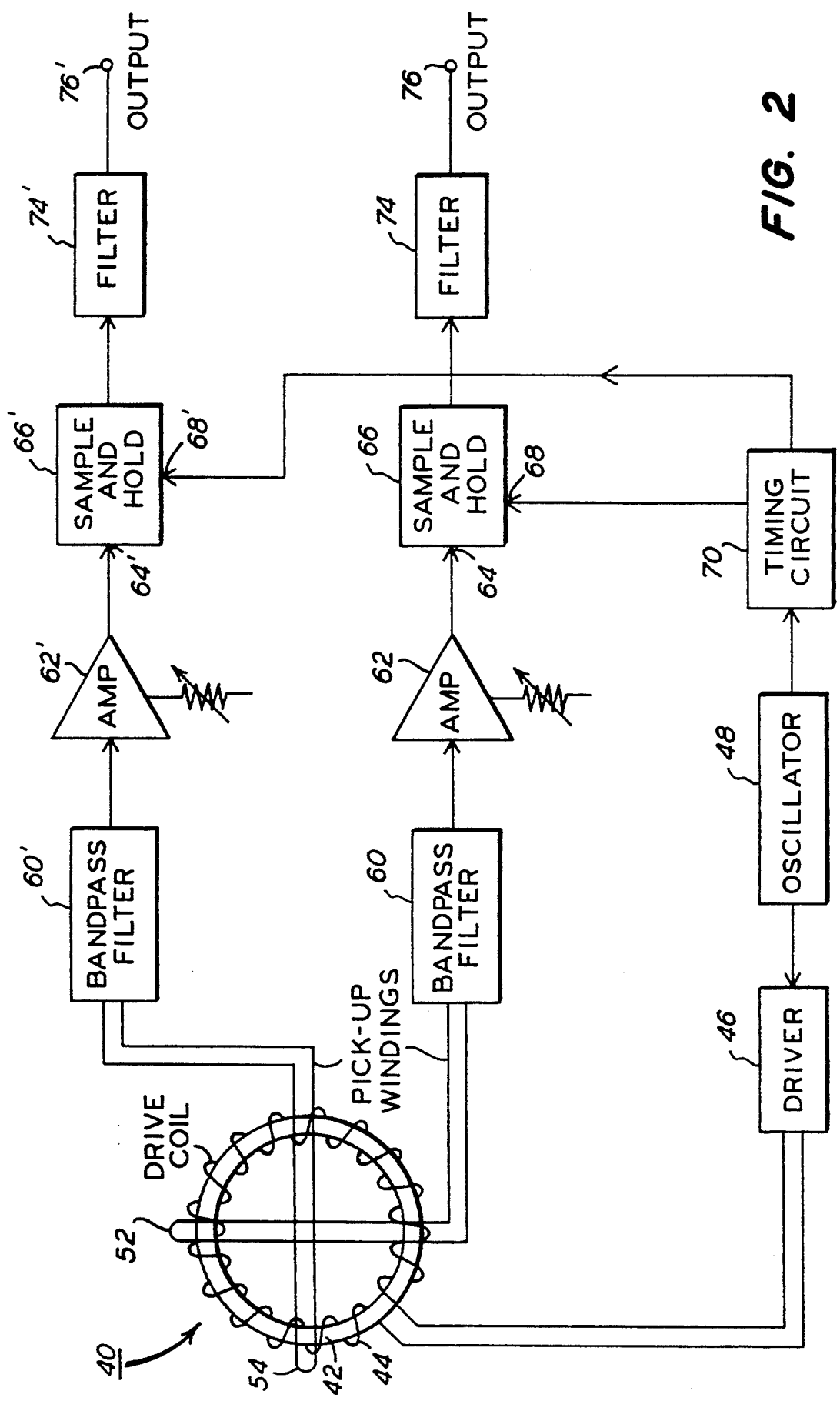
FIG. 2 is a block diagram of an exemplary signal processor in accordance with the invention.

A block diagram of a flux gate magnetometer and the associated components for providing azimuth deviation signals from the magnetometer is shown at FIG. 2. A flux gate magnetometer 40 has a toroidal core 42 made from a high magnetic permeability material, such as ferrite. A drive winding 44 is wound about the core and attached to a driver 46. The driver is driven by an oscillator 48 that produces a pulsating signal, preferably a square wave signal having a nominal frequency of 60 KHz. The frequency of the oscillator signal may vary over a relatively wide range, for example between about 1 KHz and 100 KHz. The driver 46 amplifies the oscillator signal to a level sufficient, when applied to winding 44, to repeatedly drive the magnetic core between a magnetically saturated state and an unsaturated linear state.

First and second sense windings 52 and 54 are wound on the core 42. Preferably, the sense windings are arranged in quadrature so as to optimize the signal to noise ratio of the sensor. The sense windings may be wound over the drive winding.

Each of the sense windings is connected to identical processing circuitry. We will describe only one of the processing circuits. Sense winding 52 is connected to a bandpass filter 60 which can be a high pass filter to reduce the cost. DC and low frequency components of the output of sense winding 52 are removed, and the remaining high frequency components are applied to amplifier 62, which amplifier preferably has adjustable gain. The output of amplifier 62 is an alternating sequence of positive and negative pulses, synchronized with the rising and failing edges of the square wave drive signal applied to the drive winding 44. The amplitude of the pulses is proportional to the angular position of the sensor. The pulses are applied to an input 64 of a sample and hold circuit 66. The sample and hold circuit has a gating input 68 that is driven by a timing circuit 70 that in turn is driven by oscillator 48. The output of amplifier 62 is sampled near the rising or falling edges of the square wave drive signal to provide a DC signal corresponding to the amplitude of the pulsating output signals produced by amplifier 62. The DC signal is connected to a filter 74 for removing any high frequency noise to product an output at terminal 76, which is a DC signal proportional to the angular orientation of the sensor. The elements of the second signal processing chain connected to winding 54 are designated by the same reference numerals primed and the functions are identical.

Figure 3:
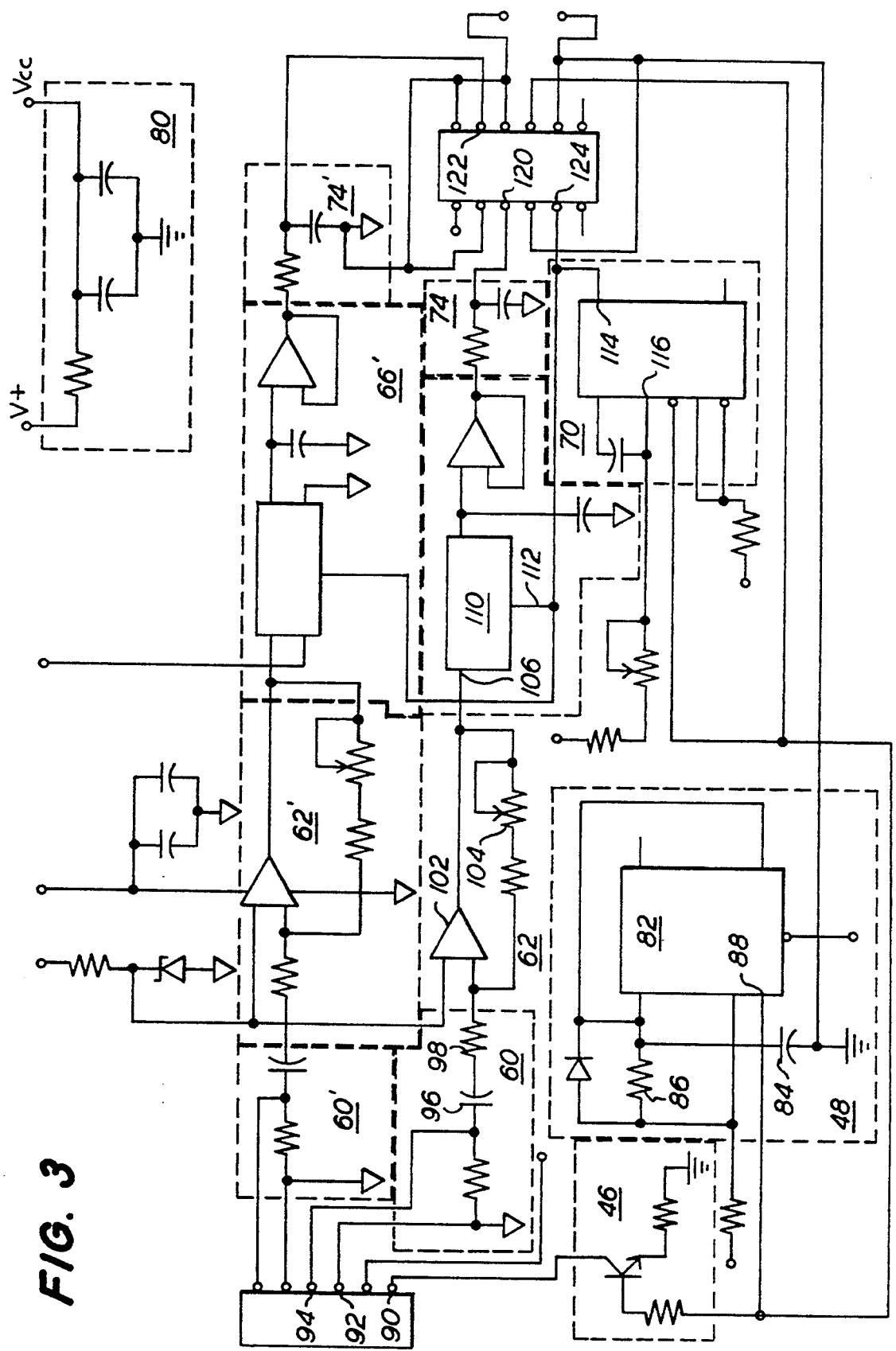
FIG. 3 is a schematic diagram of a signal processor in accordance with the invention.

The signal processor is shown in more detail in schematic diagram of FIG. 3. A power supply decoupling circuit 80 provides power to the various circuit elements shown in FIG. 3, by means of connections that have been omitted for clarity. Oscillator 48 includes a counter timer whose frequency is determined by the combination of capacitor 84 and resistor 86, and produces a squarewave output at terminal 88 that is connected to amplifier 46, which is configured in a common emitter configuration. The output of amplifier 46 is connected to a terminal 90 for connection to the flux gate magnetometer 40.

The sense winding output of the magnetometer is connected to terminals 92 and 94. Capacitor 96 forms a high pass filter connected to the sense winding, the output of which is connected to the adjustable gain amplifier stage 62, which includes an operational amplifier 102 and adjustable feedback resistor 104 for adjusting the gain. The output of amplifier 62 is connected to input terminal 106 of a sample and hold detector 110. A trigger input 112 of detector 110 is connected to the output 114 of timing circuit 70, whose input 116 is connected to the output of oscillator 48. The output of sample and hold circuit 66 is connected to low pass filter 74, whose output is connected to output terminal 120. The output of the identical second signal processing chain is connected to output terminal 122. The output of timer 70 is connected to output terminal 124 for possible use by the signal processor.

Figure 5:
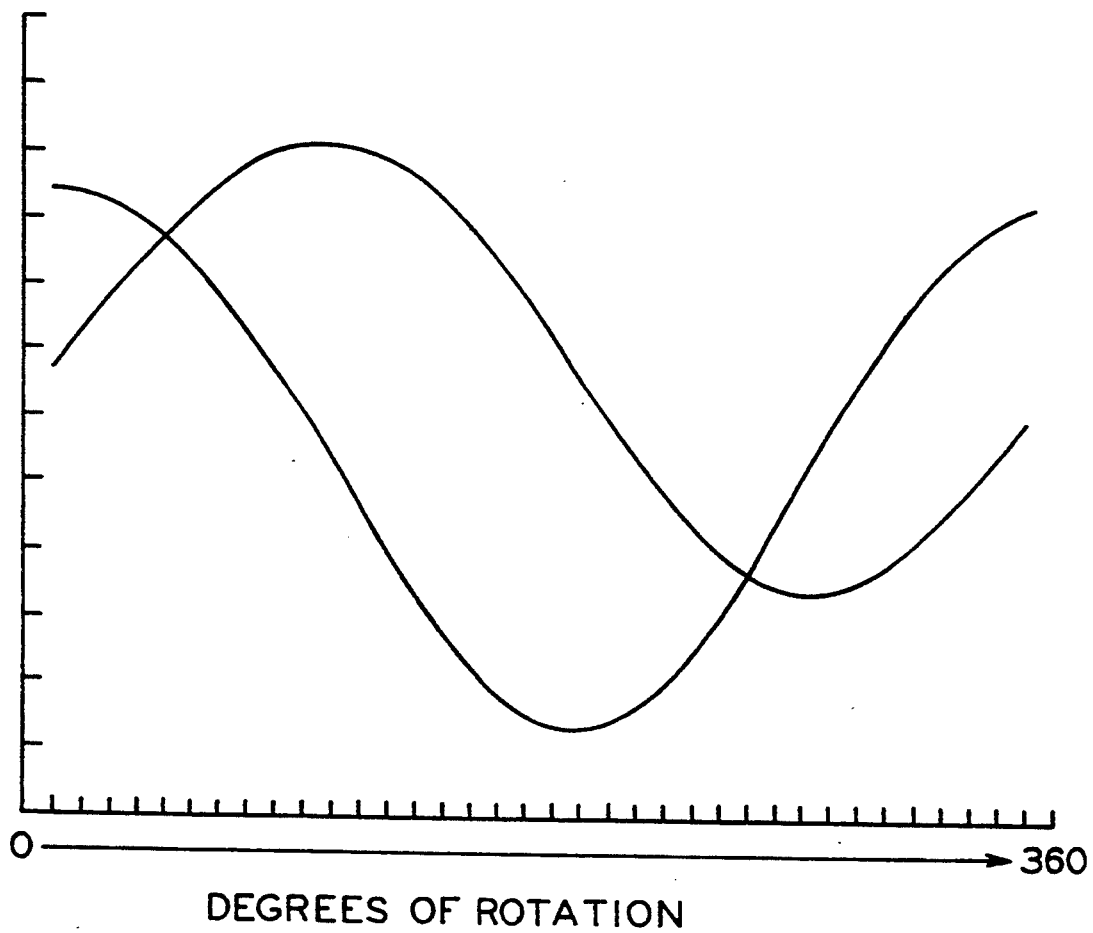
FIG. 5 is a graphical representation of the output of the signal of the invention, as a function of angular orientation.

The manner in which the head tracker of this invention operates may be better understood by referring to FIGS. 4 and 5 which graphically illustrate the signals appearing at various stages of the head tracker. FIG. 4A shows the square wave output of oscillator 48 which, as amplified by driver 46, is applied to the drive winding 44 of magnetometer 40. FIG. 44B shows the output from sense winding 52 as applied to the input of bandpass filter 60. The signal comprises a train of alternating positive and negative going pulses whose amplitude is proportional to the angular position of the sensor.

The positive and negative going pulses are aligned with the leading and trailing edges of the square wave pulses applied to the drive winding. FIG. 4C shows the timing pulses applied to the sample and hold circuit 66 by timing circuit 70. The timing pulses are aligned with the trailing edges of the square wave drive signal. 4D shows the output of filter 74 which is a DC signal proportional to the angular orientation of the sensor. FIG. 5 shows the output signals appearing at terminals 120 and 122 as a function of orientation of the sensor. Each of the signals varies sinusoidally with the output angular position with one signal leading the other by 90°. This allows the angular orientation to be uniquely determined from the two output signals.

The earth's magnetic field has a vertical component M1 and horizontal component M2. If the azimuth sensor is oriented with its access making an angle $\theta$ in the horizontal and a tilt angle $\phi$, then the output voltage V is described by $V = M_2 \cos\theta \cos\phi + M_1 \sin\phi$.

The output is therefore a function of both the azimuth and tilt angles. As long as the user holds his head level, the tilt angle $\phi$ is 0, $\cos\phi$ is 1, and $\sin\phi$ is 0 and the equation becomes $V = M_2 \cos\theta$, the tilt angle having no effect. If the tilt angle increases, the voltage deviates from a strictly sinusoidal function of the azimuth angle $\theta$. If the tilt angle $\phi$ is measured independently, for example by fit sensor 28, then the azimuth $\theta$ can be determined even if the user tilts his head.

Those skilled in the art will recognize that many modifications and changes may be made in the preferred embodiment without departing from the true spirit and scope of the invention which accordingly is intended to be defined solely by the appended claims.

What is claimed is:

1. A low cost head tracker for a virtual reality headset for determining the orientation of the headset relative to the earth's magnetic field comprising:
   a magnetic sensor responsive to the earth's magnetic field and disposed on the headset and arranged with respect to a vertical axis of rotation of the headset to produce a displacement signal related to the angular displacement of the headset with respect to a calibration orientation relative to the earth's magnetic field;
   a signal processor connected to the magnetic sensor and responsive to the magnetic sensor and responsive to the displacement signal for producing an output signal proportional to the orientation of the headset relative to the calibration orientation.

2. The head tracker of claim 1 also comprising a second sensor on the headset, arranged on an axis for measuring the angular tilt of the headset, the second sensor producing a signal proportional to the tilt of the headset.

3. The head tracker of claim 2 in which the signal processing means combines the signals from the first and second sensors to produce an output signal proportional to the orientation of the headset corrected for any error introduced in the displacement signal by any tilt of the headset.

4. The head tracker of claim 3 in which the displacement signal is described by $$V = M_2 \cos\theta \cos\phi + M_1 \sin\phi$$

where M1 is the vertical component of the earth's magnetic field, M2 is the horizontal component of the earth's magnetic field, $\theta$ is the angular orientation of the first sensor and $\phi$ is the orientation of the second tilt sensor.

5. The head tracker of claim 1 in which the magnetic sensor comprises a magnetometer having a magnetically permeable core, a drive winding and a first sense winding, and the signal processor is connected to the sense winding.

6. The head tracker of claim 5 in which the magnetometer comprises a second sense winding arranged in quadrature relative to the first sense winding, and the signal processor is connected to the first and second sense windings.

7. The head tracker of claim 6 in which the signal processor comprises a filter for passing high frequency components of the signals from the sense windings, an amplifier for amplifying the high frequency components and a converter for converting the amplified high frequency components to the output signal.

8. The head tracker of claim 7 in which the signal processor comprises an oscillator connected to the drive winding and the converter.

9. The head tracker of claim 8 in which the converter comprises a detector synchronized with the oscillator.

10. The head tracker of claim 9 also comprising a filter connected to the converter for filtering the displacement signal.

11. The head tracker of claim 4 in which the output of the first sense winding leads the output of the second sense winding so that the angular orientation can be determined unambiguously.

12. A headset for a virtual reality system comprising:
    a headset frame adapted to sit on the head of a user;
    a display, attached to the frame for viewing by the user while wearing the headset;
    a magnetic azimuth sensor attached to the headset, responsive substantially to the earth's magnetic field for producing an output signal that varies with the orientation of the headset; and
    a signal processor mounted separately from the headset, coupled to the azimuth sensor for converting the output signal to the signal useable by a virtual reality system to sense the orientation of the user's head.

13. The headset of claim 12 also comprising a second sensor on the headset, arranged on an axis for measuring the angular tilt of the headset, the second sensor producing a signal proportional to the tilt of the headset.

14. The headset of claim 13 in which the signal processing means combines the signals from the first and second sensors to produce an output signal proportional to the orientation of the headset corrected for any error introduced in the displacement signal by any tilt of the headset.

15. The headset of claim 13 in which the displacement signal is described by $$V = M_2 \cos\theta \cos\phi + M_1 \sin\phi$$

where $M_1$ is the vertical component of the earth's magnetic field, $M_2$ is the horizontal component of the earth's magnetic field, $\theta$ is the angular orientation of the first sensor and $\phi$ is the orientation of the second tilt sensor.

16. The headset of claim 12 in which the magnetic sensor comprises a magnetometer having a magnetically permeable core, a drive winding and a first sense winding, and the signal processor is connected to the sense winding.

17. The headset of claim 16 in which the magnetometer comprises a second sense winding arranged in quadrature relative to the first sense winding, and the signal processor is connected to the first and second sense windings.

18. The headset of claim 17 in which the signal processor comprises a filter for passing high frequency components of the signals from the sense windings, an amplifier for amplifying the high frequency components and a converter for converting the amplified high frequency components to the output signal.

19. The headset of claim 18 in which the signal processor comprises an oscillator connected to the drive winding and the converter.

20. The headset of claim 19 in which the converter comprises a detector synchronized with the oscillator.

21. The headset of claim 18 also comprising a filter connected to the converter for filtering the displacement signal.

22. The headset of claim 16 in which the output of the first sense winding leads the output of the second sense winding so that the angular orientation can be determined unambiguously.

* * * * *